United States Patent [19]
Berson et al.

[11] Patent Number: 5,949,879
[45] Date of Patent: Sep. 7, 1999

[54] AUDITABLE SECURITY SYSTEM FOR THE GENERATION OF CRYPTOGRAPHICALLY PROTECTED DIGITAL DATA

[75] Inventors: William Berson, Weston; Elizabeth Bernobich, New Haven; Richard W. Heiden, Huntington; Richard A. Potoczek, Danbury; Robert W. Sisson, Shelton; Anthony F. Violante, Stratford, all of Conn.

[73] Assignee: Pitney Bowes Inc., Stamford, Conn.

[21] Appl. No.: 08/706,544

[22] Filed: Sep. 6, 1996

[51] Int. Cl.⁶ .............................. H04L 9/00; H04L 9/30; H04L 9/32

[52] U.S. Cl. .................................. 380/23; 380/9; 380/21; 380/25; 380/30; 380/49; 380/51; 380/54; 380/55

[58] Field of Search ................... 380/9, 21, 23, 380/24, 25, 29, 30, 49, 50, 51, 55, 59, 18, 54; 235/379, 380; 340/825, 31, 34

[56] References Cited

U.S. PATENT DOCUMENTS

| | | |
|---|---|---|
| Re. 34,954 | 5/1995 | Haber et al. .............................. 380/49 |
| 5,136,646 | 8/1992 | Haber et al. .............................. 380/49 |
| 5,245,655 | 9/1993 | Buhn et al. .............................. 380/9 X |
| 5,339,361 | 8/1994 | Schwalm et al. ......................... 380/23 |
| 5,373,561 | 12/1994 | Haber et al. .............................. 380/49 |
| 5,384,846 | 1/1995 | Berson et al. ............................ 380/23 |
| 5,388,158 | 2/1995 | Berson ...................................... 380/23 |
| 5,420,924 | 5/1995 | Berson et al. ............................ 380/23 |
| 5,426,700 | 6/1995 | Berson ...................................... 380/23 |
| 5,530,755 | 6/1996 | Pailles et al. ............................. 380/18 |

*Primary Examiner*—Bernarr E. Gregory
*Attorney, Agent, or Firm*—Melvin J. Scolnick; Ronald Reichman

[57] ABSTRACT

A secure system for Authentication information. The system includes a scanner for reading the information contained in a document, a timing mechanism for entering the time the document was read, an encryptor for encrypting the read and timed information and a counter for counting the number of documents processed.

11 Claims, 12 Drawing Sheets

AUDITABLE SECURITY SYSTEM FOR THE GENERATION OF CRYPTOGRAPHICALLY PROTECTED DIGITAL DATA

CROSS REFERENCE TO RELATED APPLICATIONS

Reference is made to commonly assigned copending patent application Ser. No. 08/708,284 filed Sep. 6, 1996 entitled "Key Distribution System" in the names of Beth Bernobich, Richard Heiden, and Robert Sisson, allowed.

FIELD OF THE INVENTION

This invention relates generally to the field of security systems and more particularly to the field of metering the use of security systems.

BACKGROUND OF THE INVENTION

The identification of objects or other entities is a problem at least as old as history. In modern times the most prevalent solution to the problem is the identification card which serves to establish the identity of the bearer, as well as usually some characteristic, status, or attribute of the bearer. Examples of the above are the employee badge, entry access badges, drivers license, etc. Typically, such identification cards will include a picture of the normal bearer as well as relevant information pertaining to the normal bearer in text form.

While identification cards and the like have generally proven useful for the day to day conduct of affairs nevertheless they are still subject to forgery or tampering, and indeed a moderately sized illegal industry exists for the purpose of providing false identification documents.

Cryptographic techniques have been utilized to improve the security of identification cards and the identification or authentication of documents or other forms of information. For instance, bar codes and other types of codes have been affixed to many different types of identification cards and other types of documents and articles in order to make them more difficult to forge.

One approach to the problem of providing secure identification cards is to include an image of an object to be identified (typically a person's face) on one side of the card and an encrypted signal representing a compressed representation of that image on the other side of the card. To validate the card the encrypted data is decrypted by a verifier and a representation of the print image is generated and displayed for comparison with the printed image on one side of the card.

Another problem with such identification cards and with identification cards generally, is the need to issue and/or verify such cards at multiple locations while still maintaining central accounting and control. A state, for example, may wish to verify expiring drivers licenses before issuing new licenses at numerous motor vehicle offices throughout the state while maintaining central accounting and control of the total number of licenses issued. Also, a third party provider of these services may wish to allow one or more users to issue and/or verify such identification cards at one or more locations and may wish to charge for use of the technology on a per card basis.

Typically, a verifier verifies that a document or identification card is genuine by placing one or more secure decryption keys in the verifier and if the information encoded on the identification card or document with the public key can be unlocked with one or more of the decryption keys it identifies the holder of the document or card as the person described in the encoded information. Each verifier may have different cryptographic key sets to limit the number and types of symbols that may be verified.

SUMMARY OF THE INVENTION

This invention overcomes the disadvantages of the prior art by providing a secure system for authenticating information. The information may be in the form of a printed document or stored in a electronic format (disk, smart card, etc.). This invention provides for a audit-able, secure environment for the generation of cryptographically protected digital data.

The authenticator is used to produce a digital document that at a later time may be verified by a verifier. The authenticator also has the ability to charge for the production of each authenticated digital document.

DETAILED DESCRIPTION OF THE PREFERRED EMBODIMENT

Figure 1:
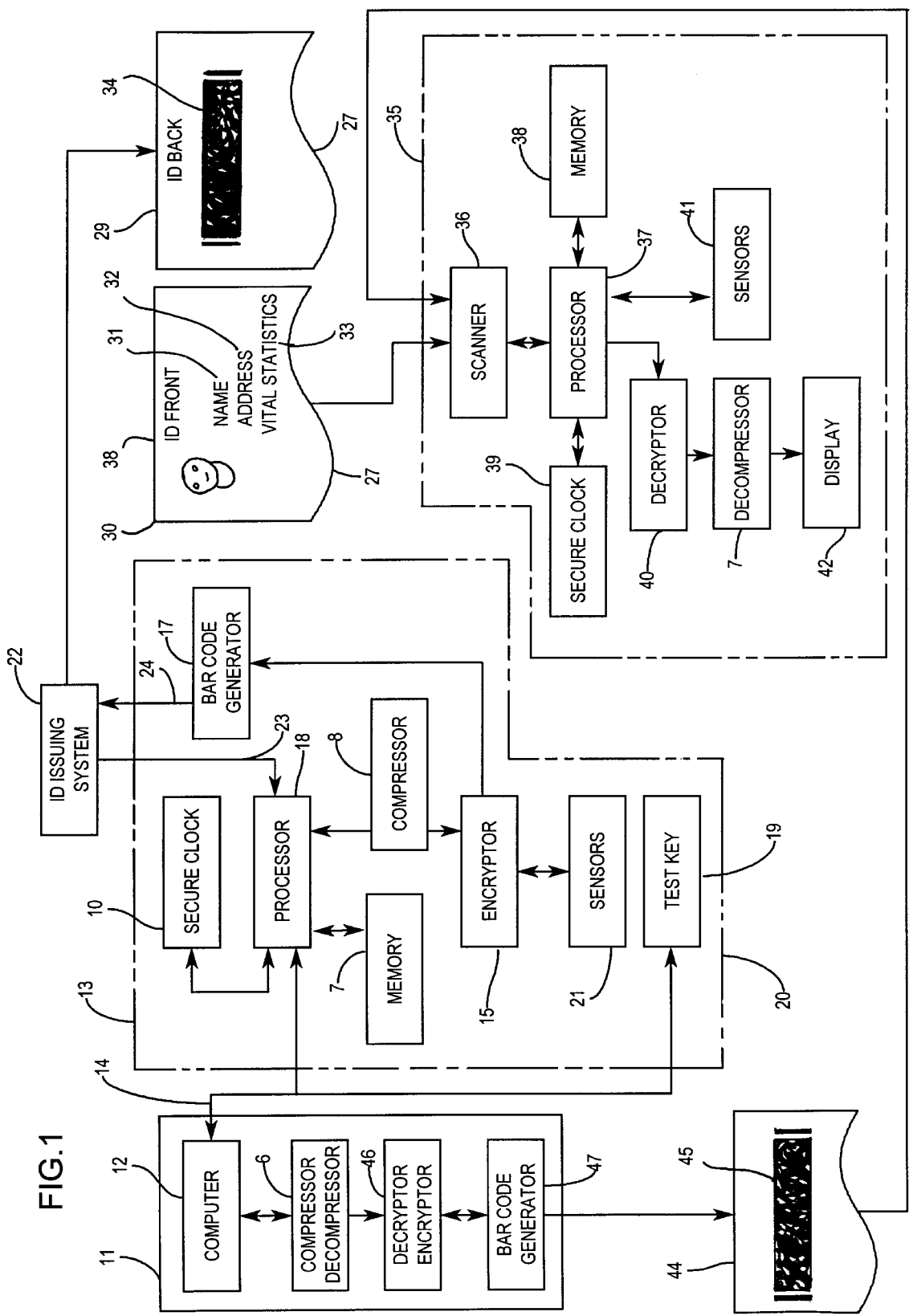
FIG. 1 is a block diagram of a system for producing identification cards and verifying that the person described in the identification card is the bearer of the identification card.

Referring now to the drawings in detail and more particularly to FIG. 1, the reference character 11 represents a data center that contains: a computer 12; a compressor/decompressor 6 that is coupled to computer 12 a decryptor/encryptor 46 that is coupled to compressor/decompressor 6; and a bar code generator 47 that is coupled to decryptor/encryptor 46. Computer 12 is coupled to authenticator 13 via communications path 14. Communications path 14 may be a telephone network, the electromagnetic spectrum, physical hard wire connections, etc. Authenticator 13 is the Pitney Bowes V110 manufactured by Pitney Bowes Inc. of Shelton, Conn.

The components of authenticator 13 are contained in a secure enclosure 20, that includes physical interlocks or sensors 21 that prevent unauthorized personnel from tampering with the components of authenticator 13. Secure enclosure 20 may be constructed in accordance with methods that are well known in the art, similar to that disclosed in; United States Federal Information Processing Standard No. 140-1. The other components of authenticator 13 that are contained in enclosure 20 include: a processor 18 that is coupled to computer 12; a memory 9 that is coupled to processor 18; a compression device 8 that is coupled to processor 18; an encryptor 15, that is coupled to processor 18 and encryption 15; a bar code generator 17, that is coupled to encryptor 15; a secure clock 10, that is coupled to processor 18 and communications path 14 that couples computer 12 to processor 18 to indicate the time information was inputted by computer 12 into authenticator 13; and a test key 19 that is coupled to computer 12 and processor 18. Periodically, authenticator 13 is inspected by the enabling of test key 19. Test key 19 may be used to test authenticator 13.

In operation encryptor 15 and processor 18 will be programmed with an encryption algorithm, as is known in the art. Reference can be had to U.S. Pat. Nos. 4,853,961, 5,073,935 and 5,142,577, herein incorporated by reference wherein suitable encryption schemes are disclosed, i.e., DES. in addition, a standard encryption scheme, such as the RSA encryption technique, can also be used for the programming of processor 18. Other encryption algorithms like Lucifer, etc. may be utilized.

Processor 18 and encryptor 15 of authenticator 13 are coupled to identification issuing system 22 via communications path 23 and bar code generator 17 is coupled to identification issuing system 22 via communications path 24. Communications path 24 may be a telephone network, the electromagnetic spectrum, physical hard wire connections, etc. Identification issuing system 22 may be any system that produces identification cards containing textual and photographic information that specifically identifies individuals. An example of system 22 is the ID-4000 manufactured by Polaroid Corporation located at Newton, Mass. 02164.

System 22 produces identification cards or documents 27. Card 27 has a front side 38 and a back side 29. Photographic 30 of the person to whom card 27 was issued appears on front side 38 of card 27, together with the name 31, address 32 and vital statistics 33 of the person to whom card 27 was issued. Bar code generator 17 will encode the information received from encryptor 15 via processor 18 and identification issuing system 22 to create a s unique bar code 34, with cryptographically protected data, that is associated with the person whose card 27 is being produced. Encrypted bar code 34, contains some or all of the information contained on front side 38 of card 27. Bar code 34 is printed or affixed to back side 29 of card 27. It will be obvious to one skilled in the art that bar code 34 may be printed with an ink that is visible or invisible to the unaided human eye.

A verifier 35 is used to determine if the bearer of card 27 is the person to whom card 27 was issued. The components of verifier 35 that are contained in enclosure 43 include: a scanner 36, that reads the information contained on back side 29 of card 27, as well as the information contained in bar code 45 of card 44; a processor 37, that is coupled to scanner 36; a memory 38 that is coupled to processor 37; a secure clock 39, that is coupled to processor 37 to indicate the time information was scanned by scanner 36; a decryptor 40 that is coupled to processor 37 to decrypt the processed information; a decompressor 7 that is coupled to decryptor 40 to expand the decrypted message to its original size and a display 42 that is coupled to decompressor 7. The operator of verifier 35 will cause scanner 36 to read the information contained in card 27. The read information will be date stamped by clock 39, processed by processor 37, decrypted by decryptor 40 and displayed by display 42. The operator of verifier 35 will then compare the bearer of card 27 with the secured information encoded in bar code 34 and determine if the bearer of card 27 is the person to whom card 27 was issued.

In operation decryptor 40 and processor 37 will be programmed with an encryption algorithm, as is known in the art. Reference can be had to U.S. Pat. Nos. 4,853,961, 5,073,935 and 5,142,577, herein incorporated by reference wherein suitable encryption schemes are disclosed, i.e., DES. in addition, a standard encryption scheme, such as the RSA encryption technique, can also be used for the programming of processor 18. Other encryption algorithms like Lucifer, etc. may be utilized.

Encoded bar code 34 and encoded bar code 45 are used to transmit secure messages or information. It would be obvious to one skilled in the art that other forms of digital communications may be used to transmit information. The messages are transformed through the use of two basic elements: a set of unchanging rules or steps called a cryptographic algorithm, and a set of variable cryptographic keys. The algorithm is composed of encryption and decryption procedures. An encryption key is used to encipher plaintext into ciphertext and a decryption key is used to decipher ciphertext into plaintext. The encryption key is the private key that is used to generate encoded bar code 34 or encoded bar code 45. and the decryption key is the public-key, i.e. the keys stored in memory 9 of authenticator 13 and memory 38 of verifier 35.

Computer 12 generates a unique client master cryptographic key pair, that includes an encryption key and a decryption key. Processor 18 of authenticator 13 generates a unique session cryptographic key pair, that includes an encryption key and a decryption key i.e. private and public key respectively The master cryptographic public-key is the key that unlocks the certificate. The certificate contains the session public key. The session public key is used to decrypt the session data. Session data may be a biometric, text data, or other binary data, which the user wishes to protect. Authenticator 13 stores the private portion of session cryptographic key pair in memory 9 and transmits the public portion of session cryptographic key pair to computer 12.

Computer 12 generates: a certificate that contains a session public key; a serial number; a time stamp; expiration date; and a palindrome (a number that reads the same backwards and forwards). The aforementioned data is then encrypted with the client master private key of computer 12. The certificate generated by computer 12 is transmitted to processor 18 via path 14. Path 14 may be a telecommunications channel, hard wire, inter process communication, network connections, radio frequency link. Communications through path 14 may be encrypted.

The photographic and textual information appearing on front side 30 of card 27 is transmitted from ID Issuing System 22 via path 23 and processor 9 to compression device 8. Path 23 may be a telecommunications channel, hard wire, inter process communication, network connections, radio frequency link. Communications through path 23 may be encrypted. Compression device 8 compresses the photographic and textual information. Compression device 8 is used to reduce the size of the information processed before encryption, since the more redundant the language or photograph, the smaller the compressed data storage requirements. It will be obvious to one skilled in the art that digital signatures may also be used to protect data. Hence, device 8 reduces the redundancy of the message as well as the work required to encrypt and decrypt the message. Encryptor 15 and processor 18 utilize a session private key stored in memory 9 to encrypt the compressed information. The aforementioned encrypted information is concatenated with the certificate received from computer 12 and transmitted to bar code generator 17. At this point authenticator 13 may perform a metering function by decrementing a descending register contained in memory 9. The metering function will be more fully described in the description of FIG. 6. Bar code generator 17 generates a bar code from the above encrypted information and transmits this bar code to identification issuing system 22. Identification issuing system produces encoded bar code 34 on the back of card 27.

Authenticator 13 may be refilled by having the user of authenticator 13 contact data center 11 via path 14. Authenticator 13 may also receive new certificates by contacting data center 11 via path 14. The foregoing process will be more fully described in the description of FIG. 8.

Figure 2A:
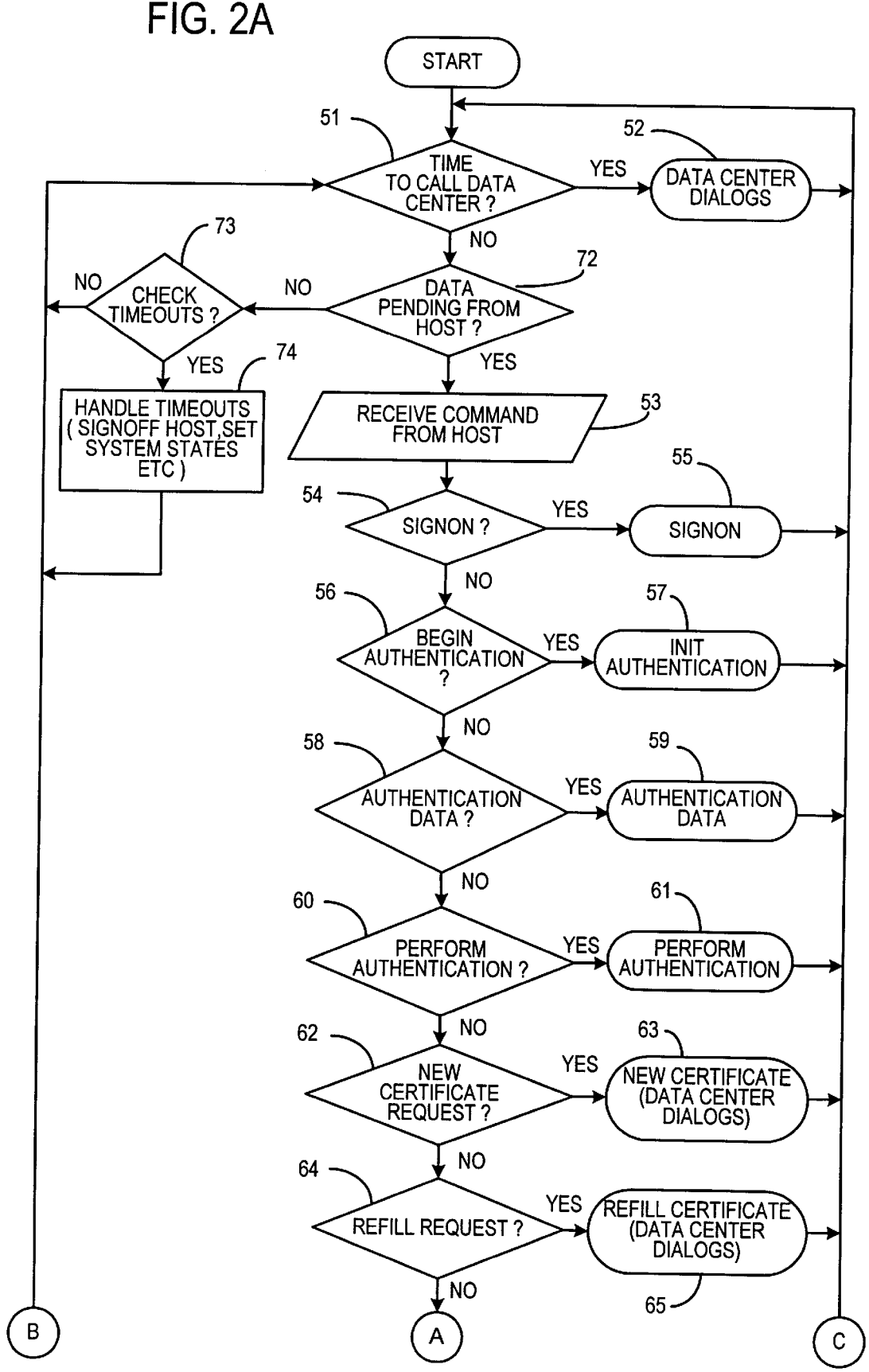
FIGS. 2A and 2B are flow charts showing the authentication program.
Figure 2B:
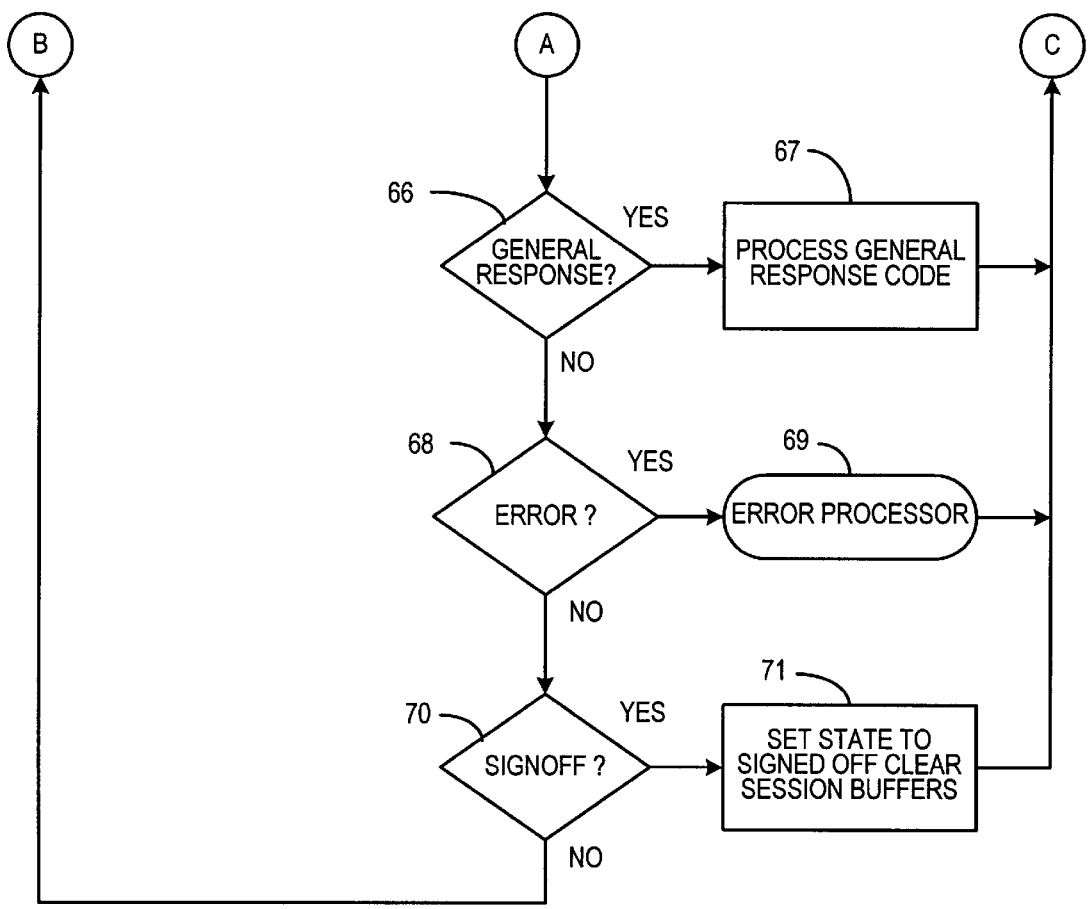

FIGS. 2A and 2B is a flow chart of the authenticator program contained in memory 9 of computer 12. The program begins at start and proceeds to decision block 51 entitled Time To Call Data Center. If, it is time to call the data center the program will go to data center dialogs 52 to execute a separate subroutine which will be more fully described as this description proceeds. If, it is not time to call the data center the program will go to decision block 72 data pending from host. In block 72 the program will determine if it is in the process of receiving data from its host computer. If, the program has not received a reply of any data it will check the time outs in decision block 73. If, a time out has occurred the program will proceed to block 74 handle time outs sign off host set system states etc. After completing the tasks mentioned in block 74 the program will proceed back to decision block 51 time to call data center. If, decision block 73 determines that there are no time outs the program will also go back to decision block 51 time to call data center.

If, in decision block 72 the program determined that data is pending from the host, then in that event the program will go to block 53 receive command from host. Now the program will read the command from the host and then the program will check to identify the command. The first command that the program will check will be in decision block 54 entitled sign on. If decision block 54 determines that it is a Signon then in that event the program will proceed to Signon 55. The operation of the Signon subroutine is more fully described in the description of FIG. 3. If, decision block 54 determines that the sign on command was not present then in that event the program would proceed to decision block 56 to begin authentication. If, decision block 56 determines to begin authentication then the program proceeds to initializes authentication in block 57. The initialization of authentication subroutine will be more fully described in the description of FIG. 4. If, decision block 56 determines that not to begin authentication then the program goes to decision block 58 authentication data. If, decision block 58 determines that authentication data is present then the program moves to block 59 entitled authentication of data. The subroutine describing the authentication of data is more fully described in the description of FIG. 5. If, decision block 58 determines that authentication data is not present then the program proceeds to decision block 60 to perform authentication. If decision block 60 determines that it is time to perform an authentication then the program proceeds to block 61 to perform the authentication. The authentication subroutine will be more fully described in the description of FIG. 6. If, decision block 60 determines it is not time to perform authentication then the program proceeds to decision block 62 new certificate request. If, block 62 determined that a new certificate request was asked for then the program would proceed to block 63 new certificate data center dialogs. The new certificate dialogs will be more fully described in the description of FIG. 7. If, decision block 62 determined that it was not a new certificate request then the program would proceed to decision block 64 refill request. If, decision block 64 determined that it was a refill request then the program would proceed to refill certificate data center dialogs block 65. This subroutine will be more fully described in the description of FIG. 8. If, decision block 64 determined that a refill request was not requested then the program would proceed to decision block 66 (FIG. 2A). If, decision block 66 determined that a general response was received then the program would proceed to process general response code in block 67. The processing of the general response code would be more fully described in the subroutine described in FIG. 9. If decision block 66 determined that no general response was received then the program would proceed to decision block 68 error. Decision block 68 determines whether or not there was a communication error or data was misread or there was an unrecognized command or somebody unplugged a wire while they were in the middle of communicating something else. If, decision block 68 determines that there was an error then the program would proceed to error processor 69. This subroutine is more fully describe in the description of FIG. 10. If, decision block 68 determined that there was not error then the program would proceed to decision block 70 sign off. If, block 70 determined that it is a sign off then the program would proceed to set state to sign off clear session buffers in block 71. This subroutine is more fully described in the description of FIG. 11. If, block 70 determines that a sign off was not requested then the program would proceed back to decision block 51 time to call data center in FIG. 2.

If decision block 72 determined that there was no data pending from the host then the program would proceed to decision block 73 check time outs. There are three basic time outs in this system. The first one is that if the host has not initially signed on i.e., the host has not communicated a command to the authenticator within a fixed period of time, the authenticator will automatically log the host off. The host being the ID issuing system 22. The second time out is a multiple part dialog that ID issuing system 22 has not responded in time, so that the authenticator is sending out a request and has not received a reply in time, when this happens the ID issuing system or authenticator will sign off. The third time out is that if ID issuing system 22 is sending a message and it starts to send the message but if the message is not completed within a fixed period of time it will generate another time out. In the above conditions the authenticator will sign off ID issuing system 22 and place ID issuing system 22 into a signed off state. Thus, before ID issuing system 22 can perform anymore functions it must sign on again. If, decision block 73 determines that there were time outs then the program proceeds to block 74 handle time out signed off host set system states etc. After block 74 handles the time outs, the program proceeds to time to call data center block 51. If, decision block 73 determine that there were no time outs then the program would proceed to time to call data center in decision block 51.

Figure 3:
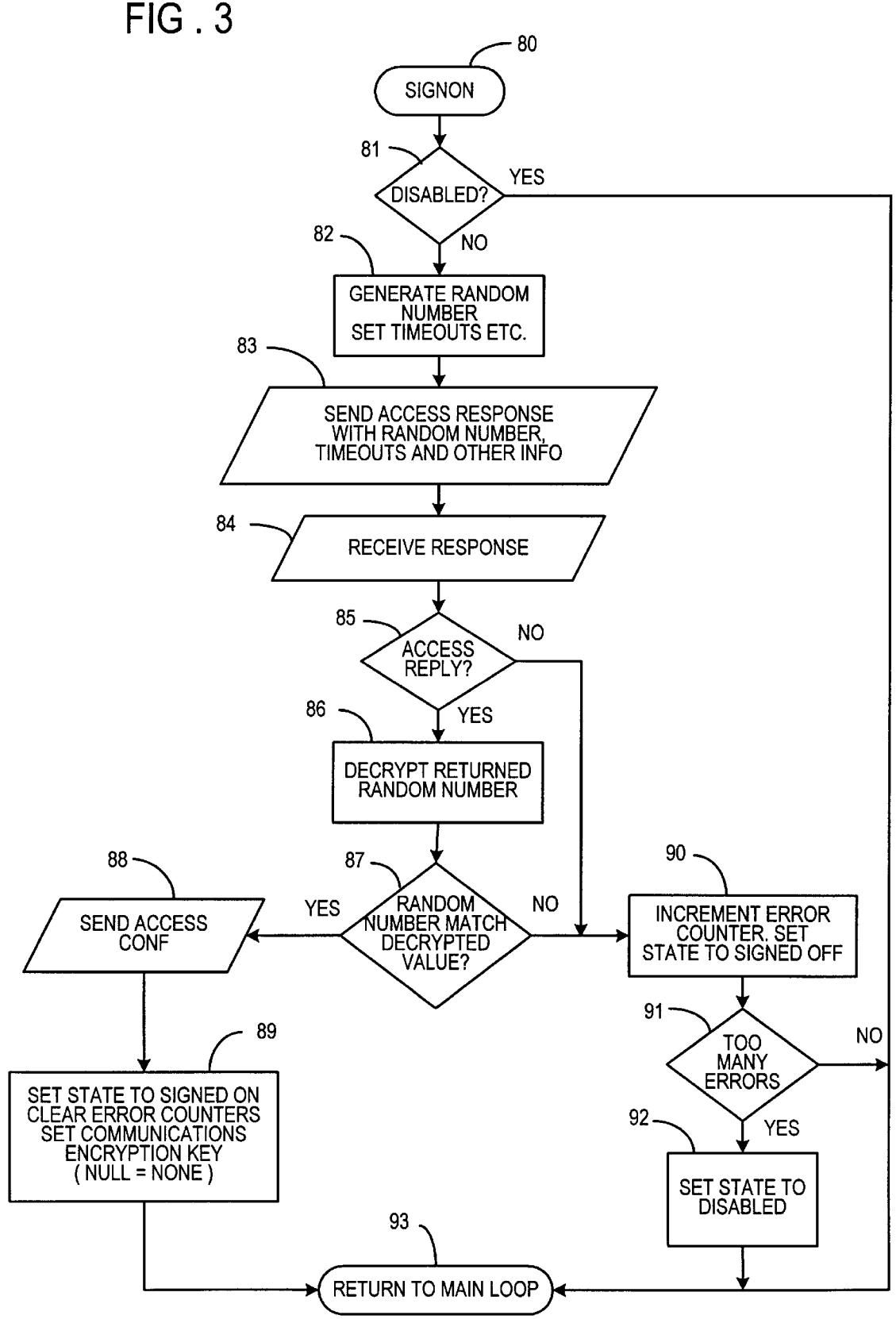
FIG. 3 is a flow chart showing the Signon Subroutine.

FIG. 3 is a flow chart showing the Signon subroutine. This subroutine begins in sign on block 80. Block 80 receives the sign on input from block 55 of FIG. 2A. The sign on subroutine is the first dialog that ID issuing system 22 will enter on each session with authenticator 13. At the beginning of this sign on process the program will proceed to decision block 81 entitled disabled. Block 81 will check on authenticators 13 initial state i.e. to see if the authenticator has been disabled. One of the reasons for disabling the sign on subroutine is if data center 11 has not been contacted within the predetermined time frame, that is it has detected some other problem. Data center 11 may be disabled if the customer who owns data center 11 hasn't paid their bill. Data center 11 could also be disabled because it is out of authentications essentially it has run out of money. For instance, each authentication cost the data center a certain amount of money. If, decision block 81 determines that data center 11 has not been disabled then the program proceeds to block 82 generate random number and set time outs. After generating the random number and setting the time outs the program proceeds to block 83 send access response with random number time outs and other information. Then the program goes to block 84 to receive a response. After receiving the response the program proceeds to decision block 85 access reply. If, decision block 85 determines that there is no access reply then the program proceeds to increment error count to set state to sign off in block 90. Then, the program proceeds to decision block 91 too many errors. If, decision block 91 determines that there are not too many errors then the program proceeds back to decision block 81 disabled. If, decision block 91 determines that there are too many errors then the program proceeds to block 92 set state to disabled. Now the program goes to block 93 return to main loop and proceeds to start in FIG. 2A. If, decision block 85 has an affirmative response then the program proceeds to decrypt the returned random number in block 86. Then, the program proceeds to decision block 87 random number match encrypted value. If decision block 85 had a negative answer the program would also proceed to decision block 87 random number match decrypted. If, the random number matched decrypted value is the same then the program would proceed to send access conference in block 8. Now the program would go to set state to signed on clear error counters set communications encryption key null equals none in block 89. At this juncture the program will return to the main loop in start block in FIG. 2A.

Figure 4:
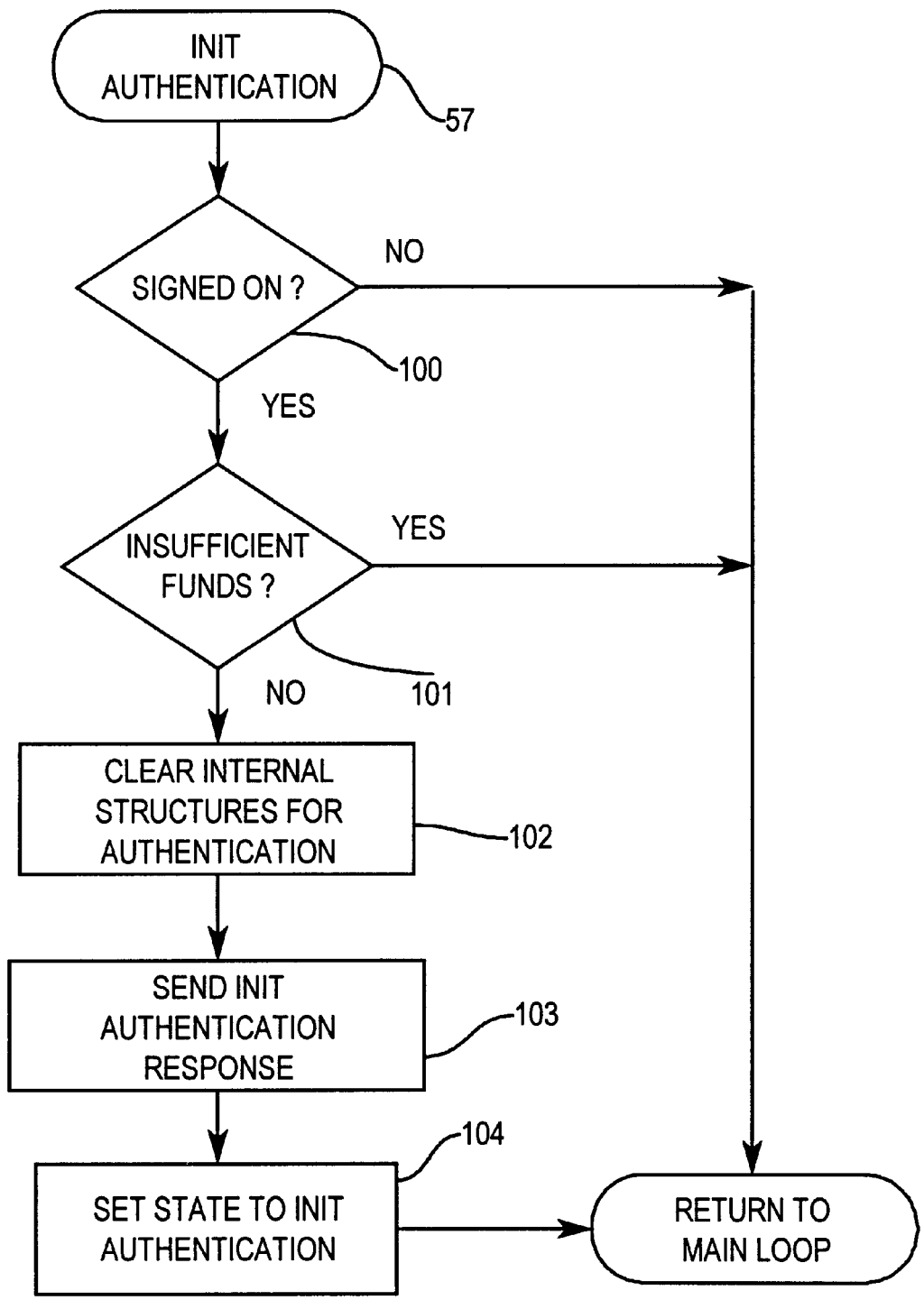
FIG. 4 is a flow chart showing the initialization Authentication Subroutine.

FIG. 4 is a flow chart showing the initialization authentication subroutine. This subroutine receives an initial authentication from block 57 of FIG. 2A. The basic purpose of this subroutine is to begin authentication that is to initialize authenticator 13 by clearing out the previously entered data. Now, the program moves to decision block 100 entitled signed on to determine if the authenticator 13 is signed on. If, decision block 100 determines that authenticator 13 is not signed on then the program proceeds to return to main loop block 93 of FIG. 2A. If, decision block 100 determines that the program is signed on, then the program would proceed to decision block 101 insufficient funds. If, sufficient funds are not present in the current certificate, the program would proceed to return to main loop block 93 (FIG. 2A). If, sufficient funds are present in block 101, the program would proceed to clear internal structures for authentication in block 102. After clearing the internal structures for authentication, the program proceeds to send the initial authentication response in block 103. After, sending the initial authentication response the program goes to block 104 to set state to initial authentication. After, the state is set the program would go to block 93 (FIG. 2A).

Figure 5:
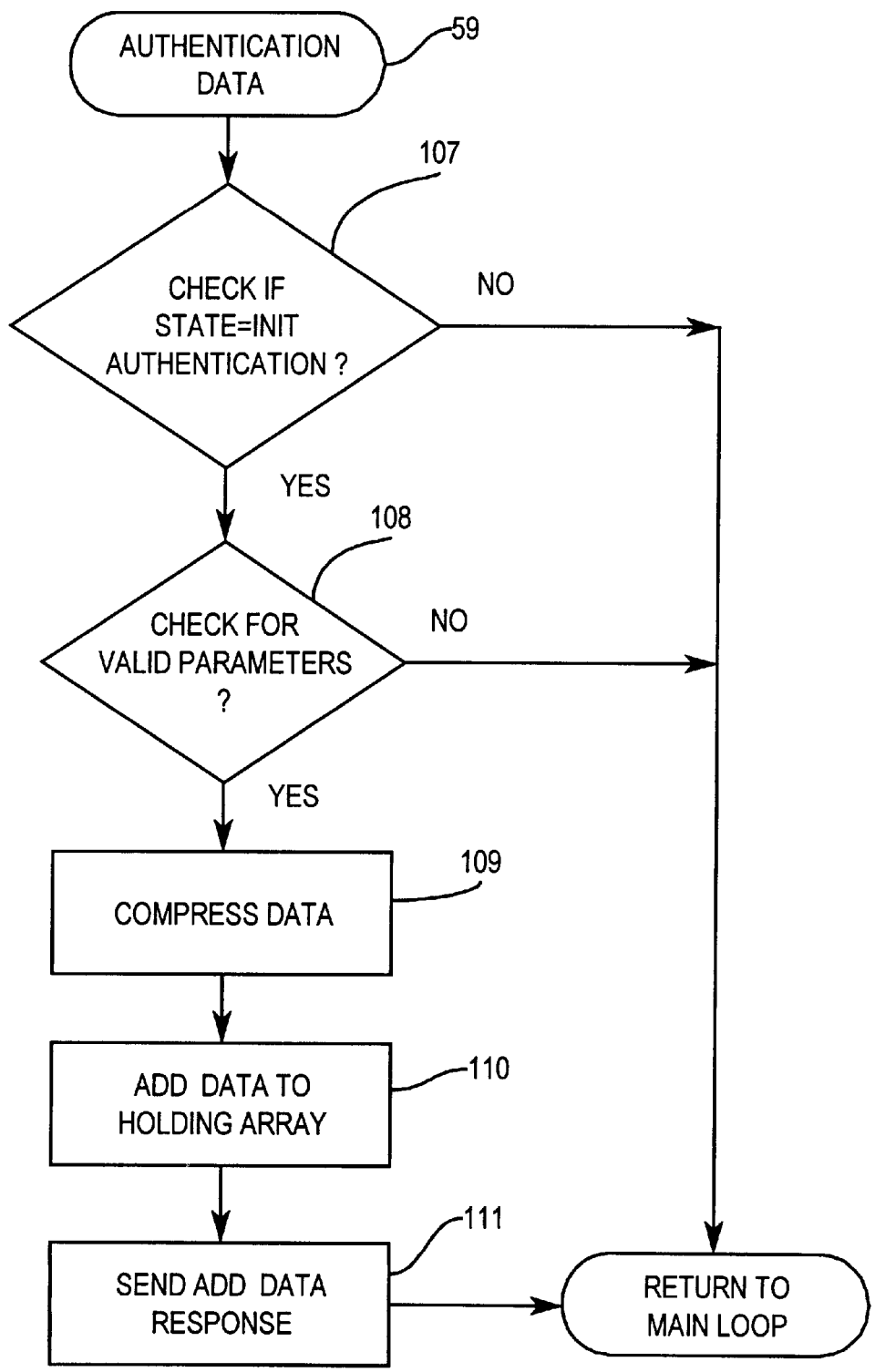
FIG. 5 is a flow chart showing the Authentication Data Subroutine.

FIG. 5 is a flow chart showing the Authentication Data Subroutine. This subroutine receives authentication data from block 59 of FIG. 2A. In decision block 107 the program checks to determine whether or not the current state equals the initialization authentication. If, the state is not equal to the initialization authentication, then the program goes to block 93 (FIG. 2A). If, the state is equal to the initialization authentication, then the program goes to decision block 108 to check for valid parameters, i.e., is the data type correct, is the encryption type correct, is the compression type correct? If, the checked parameters are not valid, then the program goes to block 93 (FIG. 2A). If, decision block 108 determined that the parameters are valid, then the program proceeds to block 109 to compress the data. Now the program goes to block 110 to add the data to the holding array. At this juncture, the program goes to block 111 to send an authentication data response to ID issuing system 22 (FIG. 1). Then, the program goes to block 93 (FIG. 2A).

Figure 6:
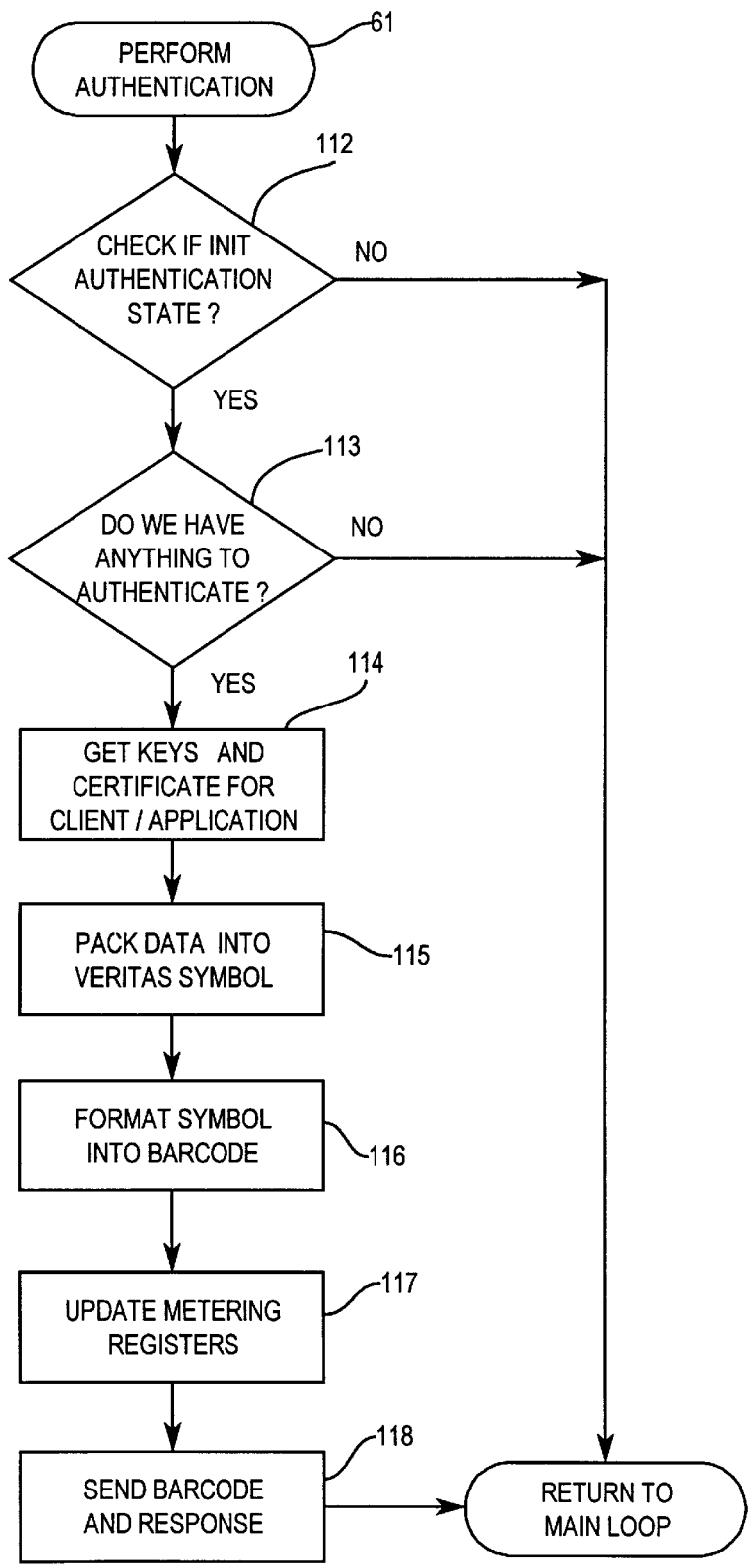
FIG. 6 is a flow chart showing the Perform Authentication Subroutine.

FIG. 6 is a flow chart showing the Perform Authentication Subroutine. This subroutine begins in block 61 of FIG. 2A. In decision block 111 the program checks to determine whether or not the authentication state is initialized. If, the state is not initialized then the program goes to block 93 (FIG. 2A). If, the state is initialized, then the program goes to decision block 113 to determine whether or not we have anything to authenticate. If, we do not have anything to authenticate, then the program goes to block 93 (FIG. 2A). If, we do have anything to authenticate, then the program goes to block 114 to get keys and certificate for the client's application. Then, the program goes to block 115 to pack the data into a symbol. Now, the program goes to block 116 to format the symbol into bar code 34. At this point, the program updates the metering registers in block 117. Then the program sends bar code 34 and a response to ID issuing system 22 (FIG. 1). At this point, the program goes to block 93 (FIG. 2A).

Figure 7:
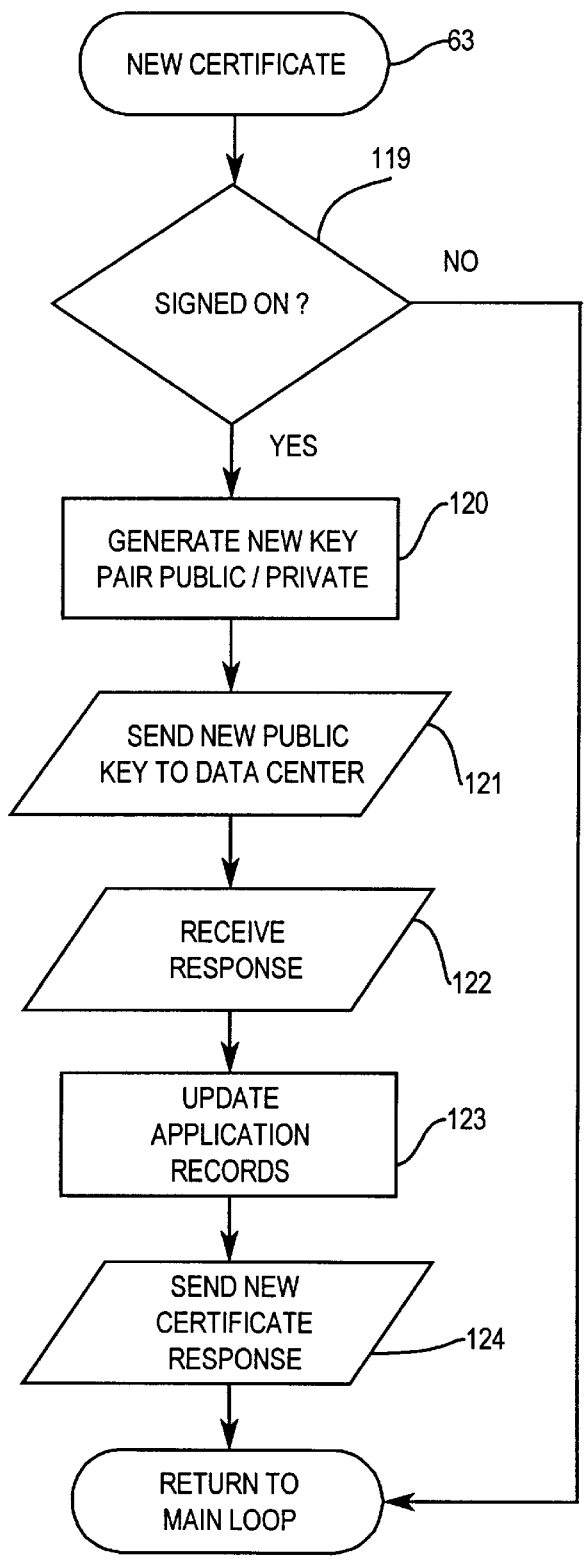
FIG. 7 is a flow chart showing the New Certificate (Data Center Dialogs) Subroutine.

FIG. 7 is a flow chart showing the New Certificate (Data Center Dialogs) Subroutine. This subroutine begins in block 63 of FIG. 2A. In decision block 119 the program determines whether or not the program is signed on. If, decision block 119 has not signed on, then the program goes to block 93 (FIG. 2A). If, decision block 119 has signed on, then the program goes to block 120 to generate a new public/private key pair. Then, the program goes to block 121 to send the new public key to data center 11 (FIG. 1). Then the program goes to block 122 to receive a new certificate from data center 11 (FIG. 1). At this point the program stores the new certificate and updates the metering registers in block 123. Now, the program goes to block 124 to send a new certificate response to ID issuing system 22 (FIG. 1). Then, the program goes to block 93 (FIG. 2A).

Figure 8:
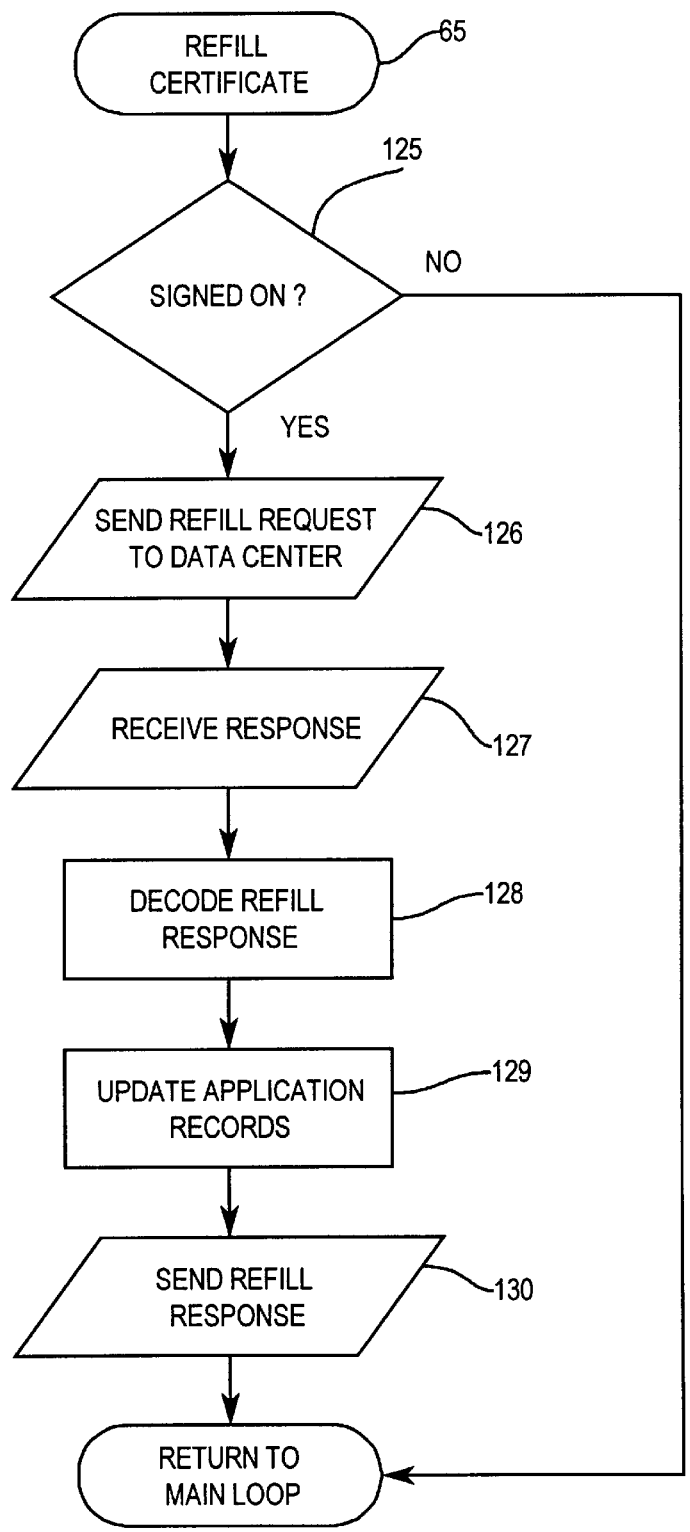
FIG. 8 is a flow chart showing the Refill Certificate (Data Center Dialogs) Subroutine.

FIG. 8 is a flow chart showing the Refill Certificate (Data Center Dialogs) Subroutine. In decision block 125 the program determines whether or not the program has signed on. If, decision block 125 has not signed on, then the program goes to block 93 (FIG. 2A). If, decision block 125 has signed on, then the program goes to block 126 to send refill requests to data center 11 (FIG. 1). Then the program goes to block 127 to receive a response from data center 11 (FIG. 1). At this point the program decodes the refill response in block 128. Now the program updates the metering registers in block 129 and sends a refill response to ID issuing system 22 (FIG. 1) in block 130. Then, the program goes to block 93 (FIG. 2A).

Figure 9:
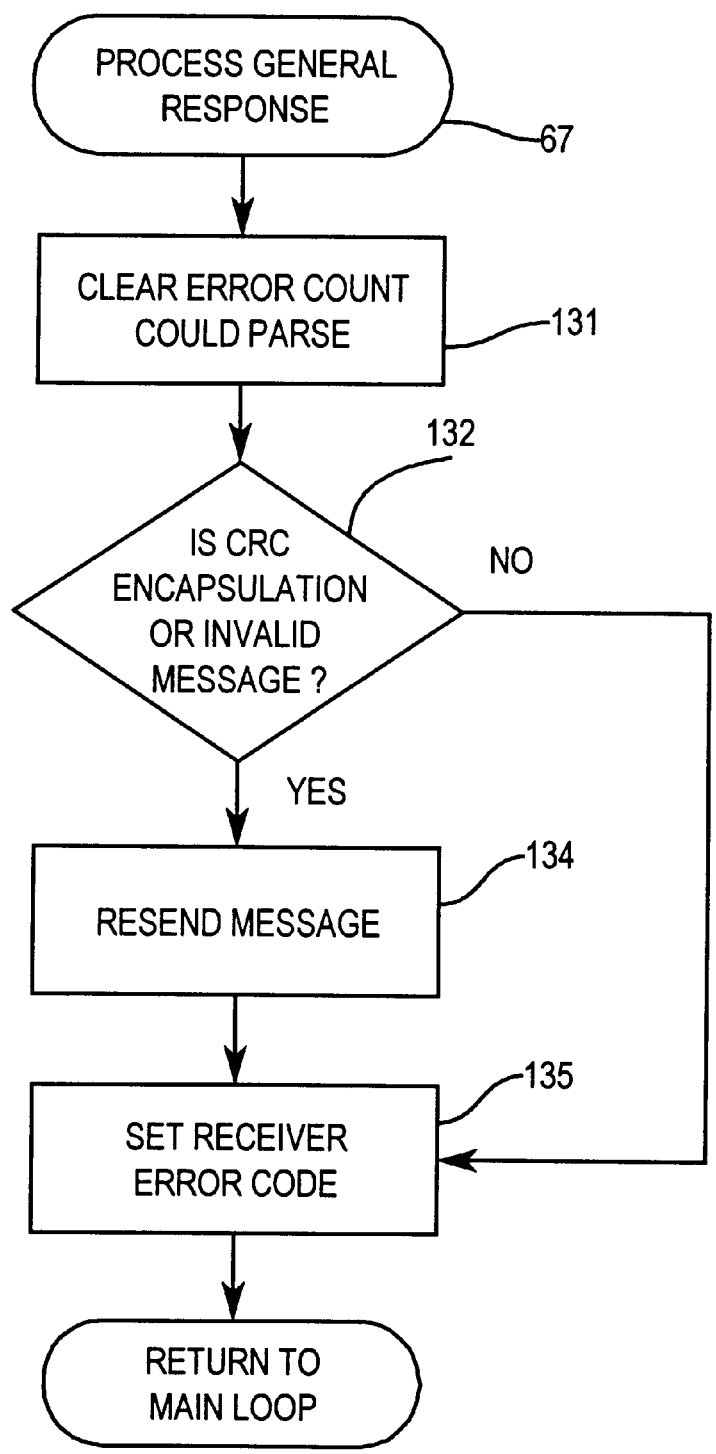
FIG. 9 is a flow chart showing the Process General Response Code Subroutine.

FIG. 9 is a flow chart showing the Process General Response Code Subroutine. This subroutine begins in block 67 of FIG. 2B. In block 131 the program clears the error count. The error count is a count of the number of consecutive communications errors between ID issuing system 22 (FIG. 1) and authenticator 13. Now, the program goes to decision block 132 to determine he error type. If, the cyclical redundancy check (CRC) encapsulation error or an invalid format message error exists, then the program goes to block 134 to ask authenticator 13 (FIG. 1) to resend the message. If, the CRC is not encapsulated or an invalid message, then the program would go to block 135. Then, the program would set a receive error code in block 135. A receive error code is the communication error for the last message received from the ID issuing system 22 (FIG. 1). Then, the program goes to block 93 (FIG. 2A).

Figure 10:
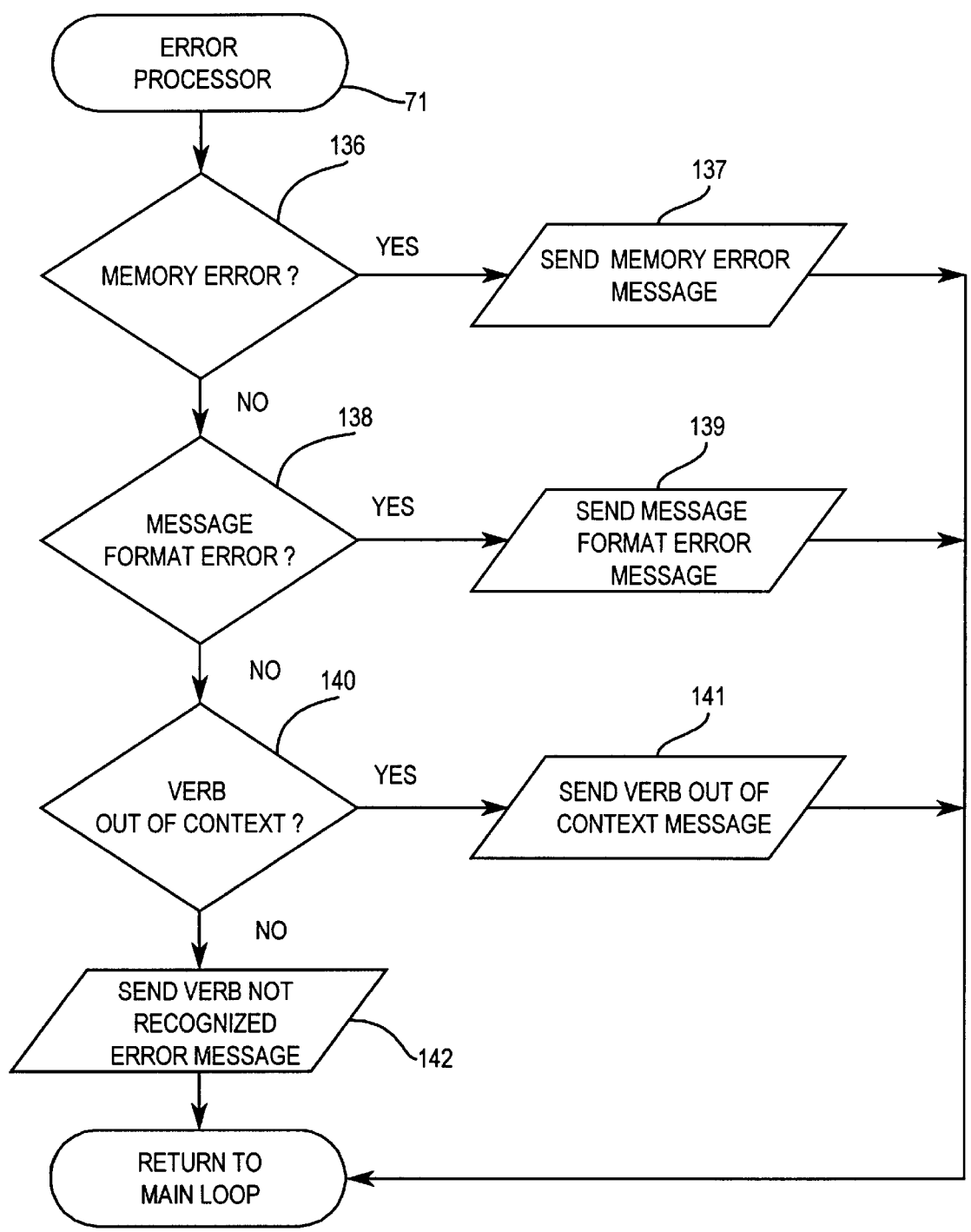
FIG. 10 is a flow chart showing the Error Processor Subroutine.

FIG. 10 is a flow chart showing the Error Processor Subroutine. This subroutine begins in block 71 of FIG. 2B. In decision block 136 the program determines whether or not there is a memory error in authenticator 13 (FIG. 1).

If, there is a memory error, then the program goes to block 137 to send a memory error message to ID issuing system 22 (FIG. 1). Then, the program goes to block 93 (FIG. 2A). Now, the program proceeds to decision block 138 to determine whether or not there is a message format error. If, there is a message format error the program goes to block 139 to send a message format error message to ID issuing system 22 (FIG. 1). Then, the program goes to block 93 (FIG. 2A). If, there was no message format error, then the program goes to decision block 140 to determine whether or not the verb is out of context. The verb context is determined by the current state of authenticator 13 (FIG. 1) i.e., signed on, authentication initialized, signed off. If, the verb is out of context, then the program goes to block 141 to send a verb out of context message to ID issuing system 22 (FIG. 1). Then, the program goes to block 93 (FIG. 2A). If, the verb was not out of context in block 140, then the program goes to block 142 to send a verb not recognized error message to ID issuing system 22 (FIG. 1). Then, the program goes to block 93 (FIG. 2A).

Figure 11:
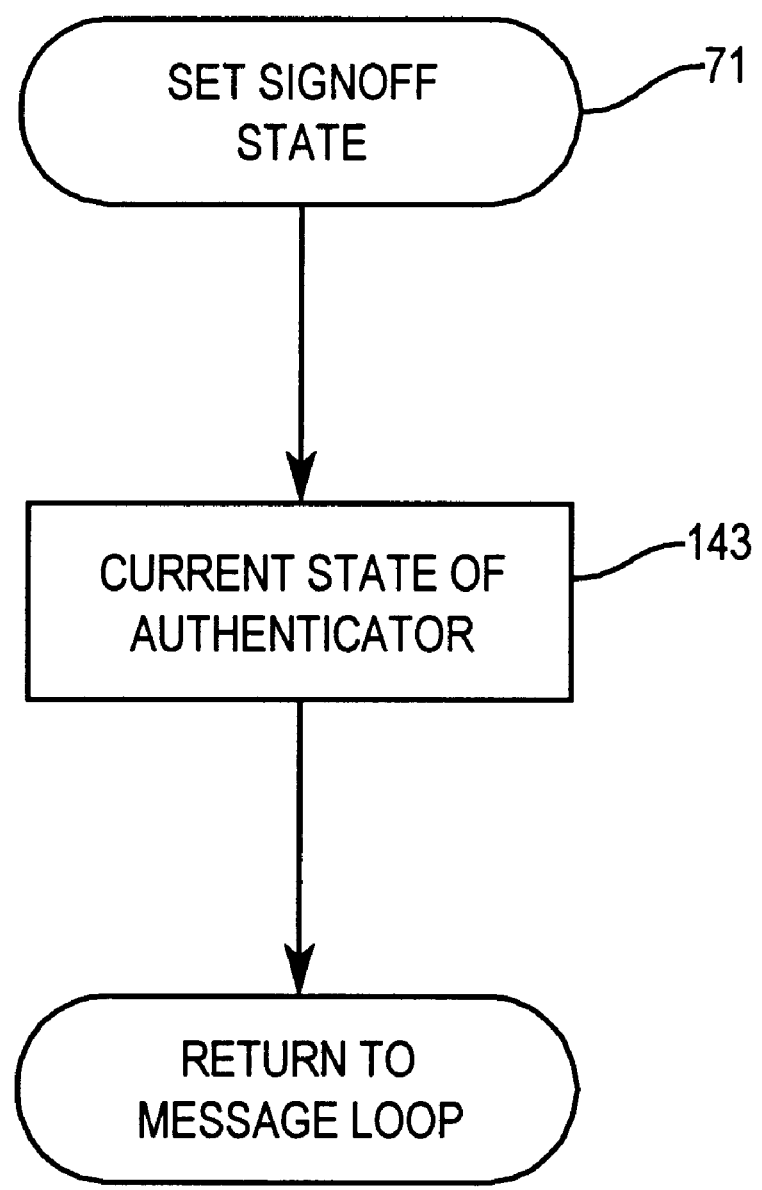
FIG. 11 is a flow chart showing the Set State To Signed Off Clear Session Buffers Subroutine.

FIG. 11 is a flow chart showing the Set State To Signed Off Clear Session Buffers Subroutine. Now, the program goes to block 143 to send the current state of authenticator 13 (FIG. 1) to indicate its signed off. Then, the program goes to block 93 (FIG. 2A).

The above specification describes a new and improved secure system for authenticating information. It is realized that the above description may indicate to those skilled in the art additional ways in which the principles of this invention may be used without departing from the spirit. It is, therefore, intended that this invention be limited only by the scope of the appended claims.

What is claimed is:

1. A system for authenticating information, said system comprising: means for reading the information contained in a document; means coupled to said reading means for securely time stamping read information; means coupled to said reading means for securely coding the information read from the document;

means coupled to said coding means for securely counting the number of documents coded by said coding means; and means for printing program updates on the documents.

2. The system claimed in claim 1, wherein the coded information is an encrypted bar code.

3. The system claimed in claim 1 further including a means for printing wherein the print means prints the represented information as a digital signal.

4. The system claimed in claim 1, wherein the coded information is an authentic symbol.

5. The system claimed in claim 4, wherein the authentication symbol is printed with an invisible ink.

6. The system claimed in claim 4, wherein the authentication symbol is a binary data stream.

7. The system in claim 1, wherein the means for printing program updates further includes a certificate of revocation.

8. The system in claim 1, wherein the means for printing prints client updates.

9. The system claimed in claim 1, wherein the means for printing further includes:

concatenated header information; and update information.

10. The system claimed in claim 1, wherein the means for printing comprises:

a computer that generates a key distribution certificate by creating a master distribution public key pair and a session distribution key pair;

a encryptor/decryptor coupled to said computer, said encryptor/decryptor encrypts the session distribution public key with the master distribution private key and encrypts the master distribution public key with the session distribution private key;

means coupled to said encryptor/decryptor for producing symbols that represent the information encrypted by said encryptor/decryptor.

11. The system claimed in claim 10, wherein said symbol means comprises:

a bar code generator.

* * * * *